(12) United States Patent
Mihlbauer

(10) Patent No.: US 8,303,811 B1
(45) Date of Patent: Nov. 6, 2012

(54) AQUARIUM FILTER ELEMENT WITH REMOVABLE INSERT

(75) Inventor: Brad L Mihlbauer, Mukwonago, WI (US)

(73) Assignee: Central Garden and Pet Company, Walnut Creek, CA (US)

( * ) Notice: Subject to any disclaimer, the term of this patent is extended or adjusted under 35 U.S.C. 154(b) by 366 days.

(21) Appl. No.: 12/694,542

(22) Filed: Jan. 27, 2010

(51) Int. Cl.
 *A01K 63/04* (2006.01)
(52) U.S. Cl. .............. 210/167.25; 210/167.27; 210/232; 210/282; 210/903; 210/906; 210/907; 210/912
(58) Field of Classification Search .............. 210/167.21, 210/167.25, 167.27, 232, 263, 282, 903, 210/906, 907, 912; 119/259
See application file for complete search history.

(56) References Cited

U.S. PATENT DOCUMENTS

| | | | |
|---|---|---|---|
| 3,669,297 A * | 6/1972 | Willinger | 210/94 |
| 4,272,372 A * | 6/1981 | Fonseca | 210/167.25 |
| 4,753,723 A | 6/1988 | Willinger | |
| 4,842,726 A | 6/1989 | Willinger | |
| 5,087,357 A * | 2/1992 | Villa | 210/167.25 |
| 5,728,293 A * | 3/1998 | Guoli et al. | 210/151 |
| 5,957,085 A | 9/1999 | Youngstrom et al. | |
| 6,029,606 A | 2/2000 | Youngstrom et al. | |
| 6,270,662 B1 * | 8/2001 | Gibson et al. | 210/163 |
| 6,397,780 B1 | 6/2002 | Youngstrom | |
| 6,484,669 B1 | 11/2002 | Mihlbauer | |
| D471,325 S | 3/2003 | Mihlbauer | |
| D472,020 S | 3/2003 | Mihlbauer | |
| 6,692,637 B2 | 2/2004 | Fox et al. | |
| 6,908,206 B1 | 6/2005 | Pinciaro | |
| 7,000,568 B1 | 2/2006 | Mihlbauer | |
| 7,060,181 B2 | 6/2006 | Fox et al. | |
| 7,134,403 B1 | 11/2006 | Mihlbauer | |
| D548,406 S | 8/2007 | Mihlbauer | |
| D565,150 S | 3/2008 | Mihlbauer et al. | |
| D565,696 S | 4/2008 | Mihlbauer et al. | |
| D570,952 S | 6/2008 | Mihlbauer et al. | |
| D571,891 S | 6/2008 | Mihlbauer et al. | |
| 7,425,274 B1 * | 9/2008 | Helfet | 210/807 |
| D598,612 S | 8/2009 | Mihlbauer | |
| 7,569,139 B2 | 8/2009 | Mihlbauer et al. | |
| 7,594,998 B2 | 9/2009 | Mihlbauer et al. | |
| 7,601,259 B2 | 10/2009 | Mihlbauer et al. | |
| 7,618,534 B2 | 11/2009 | Mihlbauer et al. | |
| 2004/0222137 A1 * | 11/2004 | Hashimoto | 210/169 |
| 2007/0251867 A1 * | 11/2007 | Mihlbauer et al. | 210/167.27 |
| 2007/0262008 A1 * | 11/2007 | Mihlbauer et al. | 210/167.27 |

\* cited by examiner

*Primary Examiner* — Fred Prince
(74) *Attorney, Agent, or Firm* — Andrus, Sceales, Starke & Sawall, LLP

(57) ABSTRACT

An aquarium filter element having a removable insert. The removable insert may include a chemical agent or biological agent for treating aquarium water.

20 Claims, 12 Drawing Sheets

AQUARIUM FILTER ELEMENT WITH REMOVABLE INSERT

BACKGROUND AND SUMMARY

The invention relates to aquarium filters and assemblies.

Aquarium filter elements and assemblies are known in the prior art. (See, e.g., U.S. Pat. Nos. 7,618,534; 7,601,259; 7,594,998; and 7,569,139, the contents of which are incorporated herein by reference in their entireties). The present invention arose during continuing development efforts directed toward improved construction, performance and features of aquarium filter elements and assemblies.

Provided herein is an aquarium filter element with a removable insert. Typically, the insert is permeable and contains one or more agents for treating aquarium water, such as chemical agents and biological agents, as aquarium water passes through the insert.

DETAILED DESCRIPTION

Prior Art

Aquarium filter assemblies including filter elements are known in the art. (See, e.g., U.S. Pat. No. 7,618,534 (hereinafter the "'534 patent") the content of which is incorporated herein by reference in its entirety). By way of example only, reference is made to the aquarium filter assemblies and filter elements disclosed in the '534 patent, although the aquarium filter assemblies and filter elements contemplated herein are not limited to those configurations for aquarium filter assemblies and filter elements disclosed in the '534 patent. Other configurations for aquarium filter assemblies and filter elements are contemplated, including, but limited to, those disclosed in U.S. Pat. Nos. 7,601,259; 7,594,998; and 7,569,139, the contents of which are incorporated herein by reference in their entireties.

Figure 1:
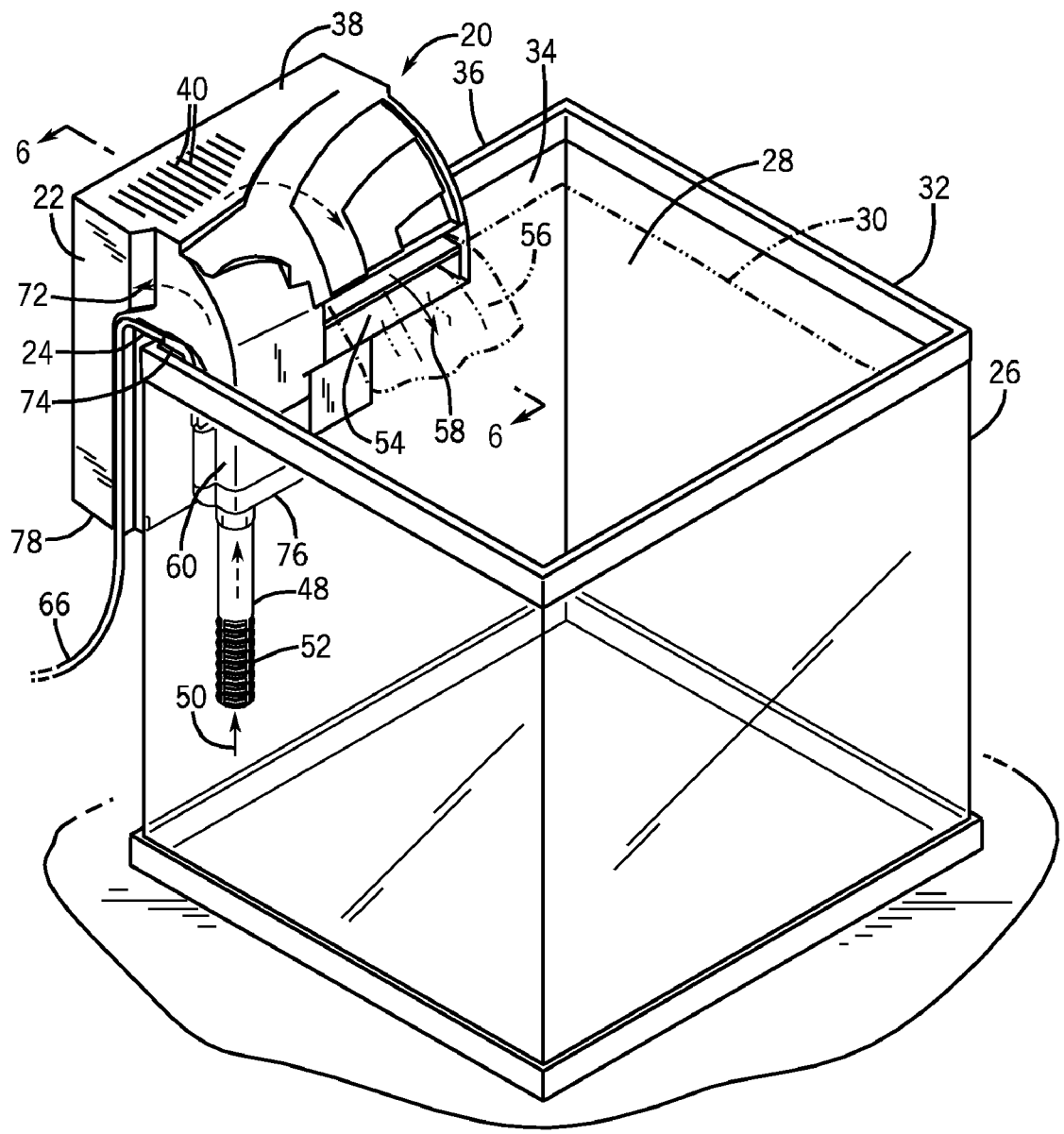
FIG. 1 is a perspective view of a prior art aquarium filter assembly mounted to an aquarium tank.

FIG. 1 shows an aquarium filter assembly 20 of the prior art including a housing 22 having mounting structure 24 for mounting to an aquarium tank 26. The tank has an interior 28 holding aquarium water therein as shown at water line 30, and has an exterior at 32. The tank has a sidewall 34 with a top 36. The housing has a removable top cover 38, FIG. 2, having vent openings or slits 40. A filter cartridge 42 is provided in the housing, which comprises a holster 110 and a filter element 106. The filter cartridge has an upstream face 44 provided by the upstream face of the filter element 106, FIG. 3, and a downstream face 146 provided by the downstream face of the holster 110. The housing has an inlet 48 receiving dirty aquarium water as shown at arrow 50 through inlet grate or screen 52, and has an outlet 54 returning clean filtered water to the tank, as shown at water flow 56 at arrow 58. The housing defines a water flow path therethrough from upstream to downstream from inlet 48 to outlet 54. A water pump 60 in the housing is at least partially submerged in the water in the tank and pumps water along the noted flow path by means of impeller 62 driven by electric motor 64 connected to a source of electrical power by power cord 66 to pump water from pumping chamber 68 upwardly through channel 70 as shown at arrow 72 in FIGS. 4, 6, to pump the water along the noted flow path through the housing. Housing 22 is an inverted U-shaped saddle having an upper bight 74, FIGS. 1-3, 6 at the top 36 of sidewall 34 of the tank, and having inner and outer legs 76 and 78, respectively, depending downwardly from bight 74. Inner leg 76 extends into the interior 28 of tank 26. Outer leg 78 extends along the exterior 32 of tank 26. Filter cartridge 42 is in outer leg 78. Water pump 60 is in inner leg 76. Motor 60 is detachable from the housing at living hinge spring clip 61.

Housing 22 has a filter chamber 80, FIGS. 2, 3, 4, 6, receiving filter cartridge 42 therein. The filter cartridge 42 divides filter chamber 80 into a filter inlet plenum 82 receiving water from inlet 48, and a filter outlet plenum 84 delivering water to outlet 54. Upstream face 44 of the filter cartridge faces filter inlet plenum 82. Downstream face 146 of the filter cartridge faces filter outlet plenum 84. Housing 22 has a supply plenum 86 receiving water from water pump 60 through channel 70 and passage 71, and supplying the water to filter inlet plenum 82. Supply plenum 86 has an overflow bypass passage 88, FIGS. 4, 6, 7, supplying water from supply plenum 86 to filter outlet plenum 84 and bypassing filter cartridge 42 in response to clogging of the filter cartridge causing a given rise in water level in housing 22. Supply plenum 86 spans inner and outer legs 76 and 78. Housing 22 has a return plenum 90, FIGS. 4, 6, 7, spanning inner and outer legs 74 and 78 and crossing over the noted top 36 of sidewall 34 of aquarium tank 26 and returning water from filter outlet plenum 84 to outlet 54. Water from overflow bypass passage 88 from supply plenum 86 joins with water in filter outlet plenum 84 and return plenum 90 downstream of downstream face 146 of the filter cartridge. Supply plenum 86 has a cross-over portion 92, FIGS. 3, 4, directly above the top 36 of sidewall 34 of tank 26. Return plenum 90 has a cross-over portion 94 directly above the top 36 of sidewall 34 of tank 26. Cross-over portion 94 has a lower wall 96, FIGS. 3, 4, 6, 7, therealong. Cross-over portion 94 is laterally adjacent cross-over portion 92, and there is a plenum sidewall 98 therebetween. Plenum sidewall 98 extends from lower wall 96 of cross-over portion 94 upwardly to overflow bypass passage 88 at the top of sidewall 98.

Filter chamber 80 and filter cartridge 42 have respective first and second coacting keyed detents 102 and 104, FIGS. 2, 2A, 3, 5, 6, mating with each other to at least one of: a) orient and permit mounting of filter cartridge 42 in filter chamber 80 only with upstream face 44 facing filter inlet plenum 82, and downstream face 146 facing filter outlet plenum 84; and b) permitting mounting of only an authorized filter cartridge in filter chamber 80, namely a filter cartridge having a coacting keyed detent to mate with coacting keyed detent 102 of filter chamber 80. The coacting keyed detent of the filter cartridge may be present in the filter element 106, in the holster 110, or in both. In one embodiment, filter cartridge 42 includes a filter element 106, FIG. 3, having the noted second detent 104. In another embodiment, the filter cartridge 42 includes a holster 110 having the noted second detent 112. First and second detents (e.g., 102 and 104) are aligned with each other and non-symmetrically disposed in offset relation in filter chamber 80. In one preferred form, first detent 102 is provided by a standing rib extending from housing 22 into filter chamber 80, and second detent 104 is provided by an aligned slot in the filter element receiving standing rib 102 in inserted relation. In another embodiment, the filter element of the filter cartridge has an auxiliary detent, as shown in dashed line at 108 in FIG. 3, spaced from detent 104 and, upon 180° reversal of orientation of filter element 106, coacting and mating with detent 102 to permit orientation and mounting of filter element 106 in filter chamber 80 in an alternate reversed orientation position with upstream face 44 facing filter outlet plenum 84 rather than filter inlet plenum 82, and downstream face 46 facing filter inlet plenum 82, to permit reversal of orientation of filter element 106 as desired. The orientation of filter element 106 is reversed by removing it from holster 110, to be described, and rotating filter element 106 180° about a vertical axis. If filter element 106 is reversible and can desirably or equivalently filter water flow in either direction, then the inclusion of both detents or slots 104 and 108 is preferred, to enable filter element 106 to be mounted in either of 180° opposite orientations. If filter element 106 has a preferred orientation, for example a differential gradient density filter where it is preferred that upstream face 44 be facing upstream and downstream face 46 be facing downstream, then only a single detent or slot 104 is preferred, and detent or slot 108 is eliminated, such that filter element 106 can only be mounted and oriented in a single orientation position, namely with upstream face 44 facing upstream toward filter inlet plenum 82. In the two slot version: detents 102 and 104 are aligned with each other and non-symmetrically disposed in offset relation in filter chamber 80 when upstream face 44 faces filter inlet plenum 82 and downstream face 46 faces filter outlet plenum 84; and detents 102 and 108 are aligned with each other and non-symmetrically disposed in offset relation in filter chamber 80 when upstream face 44 faces filter outlet plenum 84 and downstream face 46 faces filter inlet plenum 82, upon reversal of filter element 106. In one embodiment, as noted, detent 102 is provided by a standing rib extending from housing 22 into filter chamber 80, detent 104 is provided by a first slot in filter element 106 aligned with and receiving standing rib 102 in inserted relation when upstream face 44 faces filter inlet plenum 82 and downstream face 46 faces filter outlet plenum 84, and auxiliary detent 108 is provided by a second slot in the filter element aligned with and receiving standing rib 102 in inserted relation when upstream face 44 faces filter outlet plenum 84 and downstream face 46 faces filter inlet plenum 82.

Figures 2, 2A:
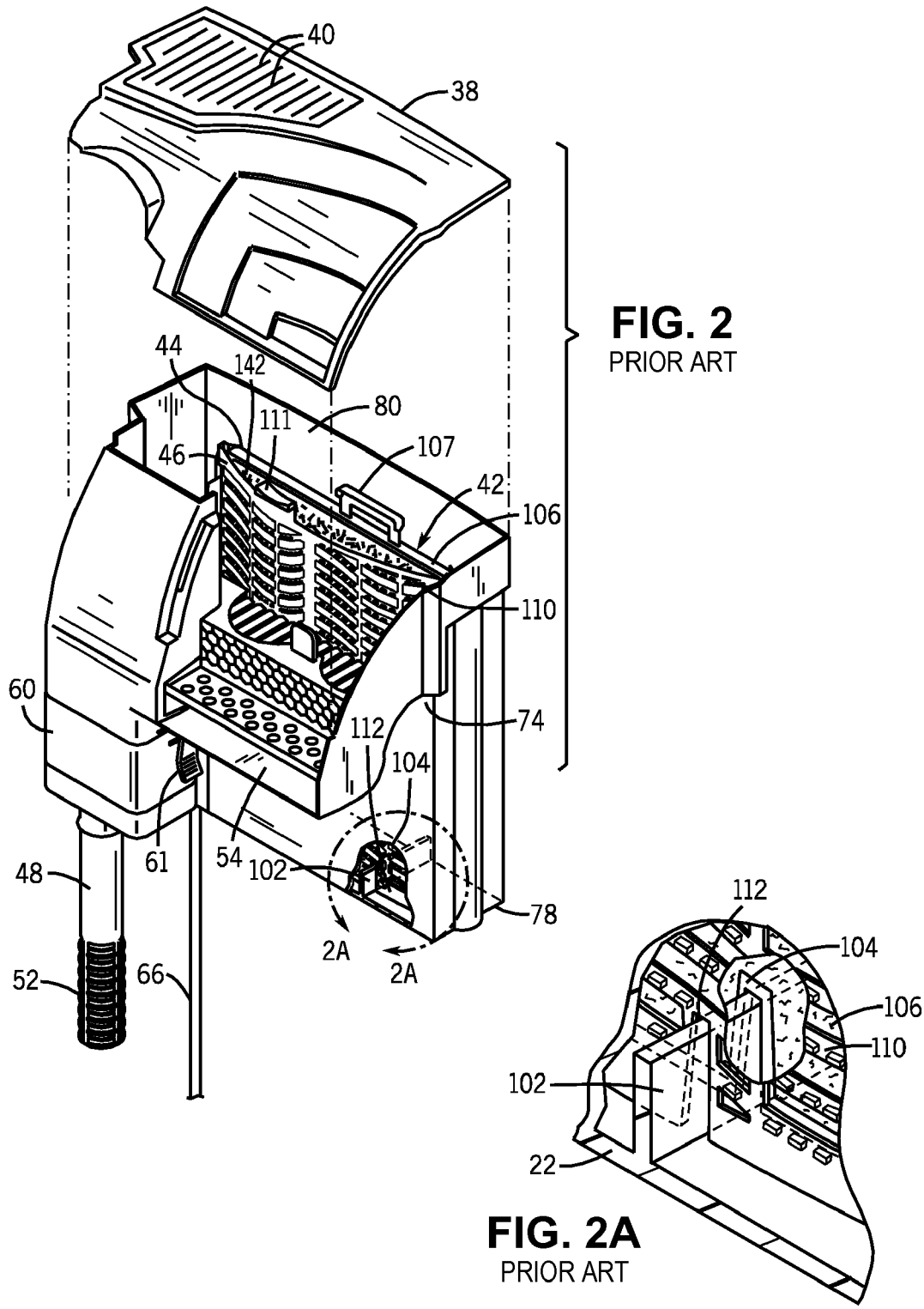
FIG. 2 is a perspective view of the aquarium filter assembly of FIG. 1, partially cut-away and with cover removed.
FIG. 2A is an enlarged view of a portion of FIG. 2 at line 2A-2A.
Figure 3:
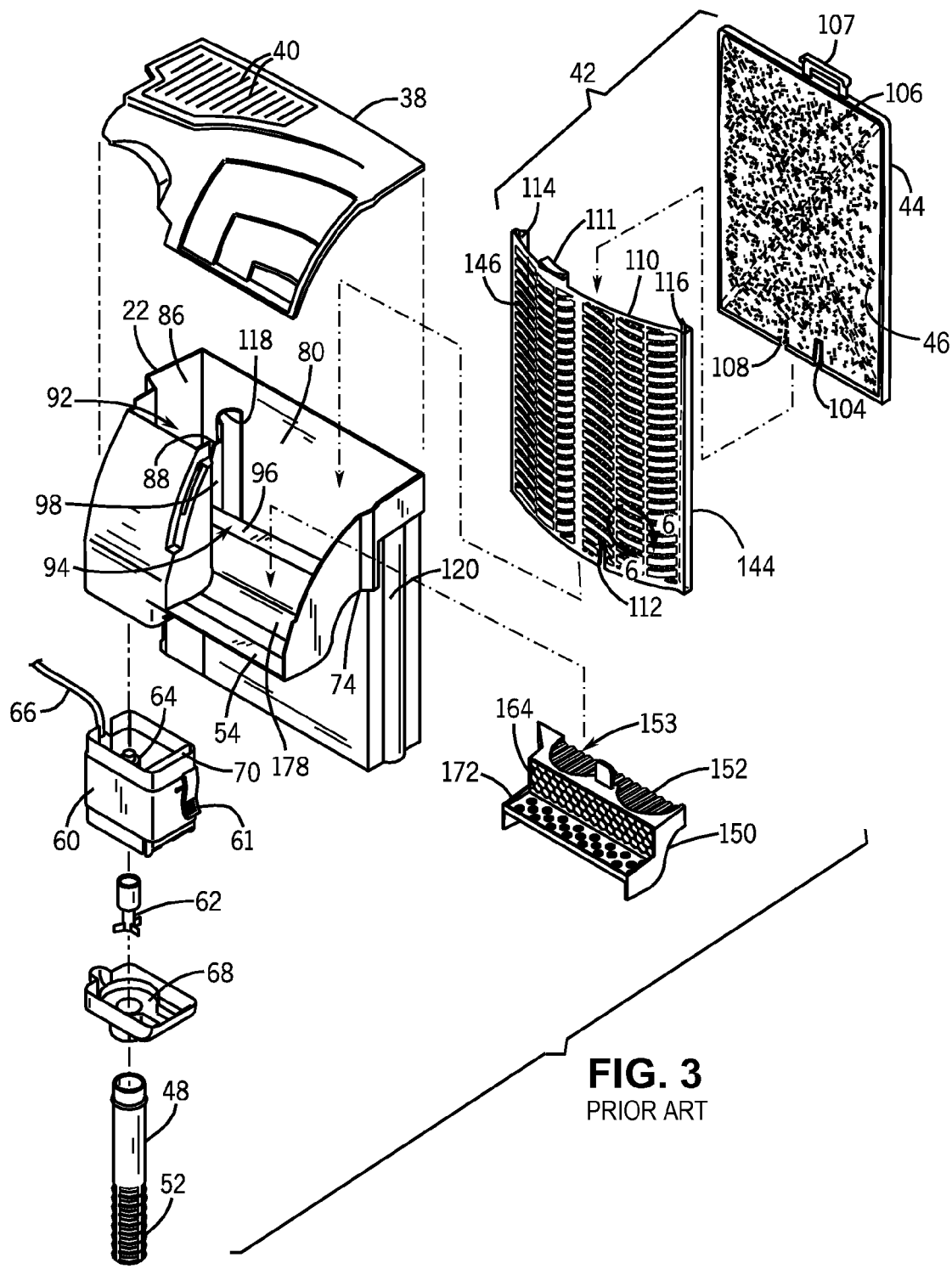
FIG. 3 is an exploded perspective view of the aquarium filter assembly of FIG. 2.

The filter cartridge 42 typically includes the noted replaceable filter element 106 and may additionally include a holster 110, FIGS. 2, 3. Replaceable filter element 106 is removably supported in holster 110 and is slidable downwardly thereinto. Filter element 106 and holster 110 have respective grip tabs 107 and 111. The holster has a detent 112 aligned with detent 104 and coacting with and mating with detent 102. Detents 102, 104, 112 are aligned with each other and non-symmetrically disposed in offset relation in filter chamber 80. In one embodiment, detent 102 is provided by the noted standing rib extending from housing 22 into filter chamber 80, and detents 104 and 112 are provided by aligned slots receiving standing rib 102 in inserted relation. Auxiliary detent 108 of filter element 106 is spaced from detent 104 and, upon 180° reversal of filter element 106, detent 108 coacts and mates with detent 102 and is aligned with detent 112 to permit orientation and mounting of filter element 106 in holster 110 in filter chamber 80 with upstream face 44 facing filter outlet plenum 84, to permit reversal of orientation of filter element 106 as desired. As above, if filter element 106 has a preferred orientation, then slot 108 is eliminated, which in turn permits orientation and mounting of filter element 106 in the filter chamber 80 only with upstream face 44 facing filter inlet plenum 82 and downstream face 46 facing filter outlet plenum 84. If optional dual alternate orientation is desired, then slot 108 is provided, and: detents 102, 104, 112 are aligned with each other and non-symmetrically disposed in offset relation in filter chamber 80 when upstream face 44 faces filter inlet plenum 82 and downstream face 46 face filter outlet plenum 84; and detents 102, 108, 112 are aligned with each other and non-symmetrically disposed in offset relation in filter chamber 80 when upstream face 44 faces filter outlet plenum 84 and downstream face 46 faces filter inlet plenum 82.

Filter element 106 and holster 110 engage each other in sliding relation along distally opposite guide tracks 114 and 116, FIG. 3, enabling removal of filter element 106 from holster 110. Holster 110 and filter chamber 80 engage each other in sliding relation along distally opposite guide tracks 118 and 120, FIGS. 3, 4, 7, enabling removal of holster 110 from filter chamber 80. Guide tracks 114 and 118 are adjacent and parallel to each other. Guide tracks 116 and 120 are adjacent and parallel to each other.

Figure 4:
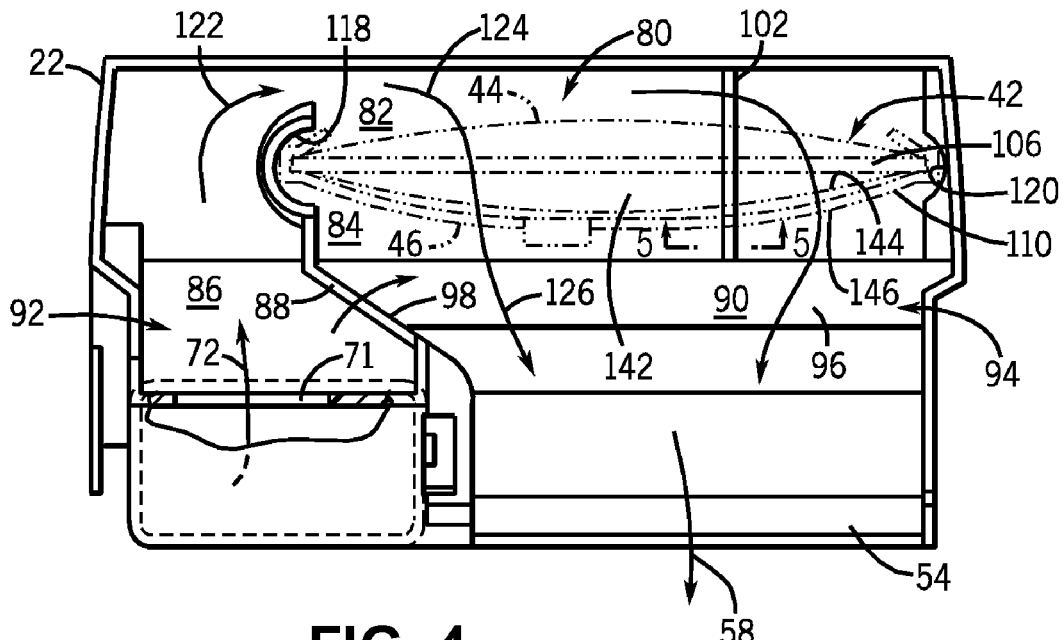
FIG. 4 is a top view of a component of FIG. 3.
Figure 5:
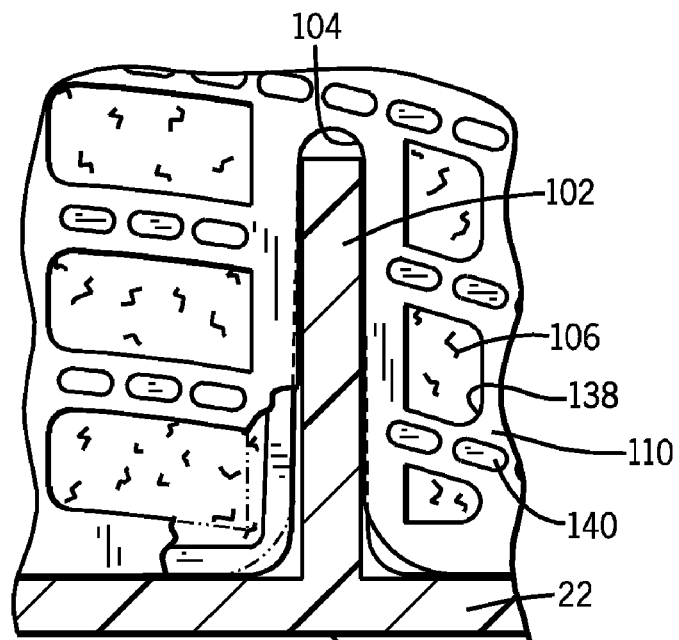
FIG. 5 is a sectional view taken along line 5-5 of FIG. 4.
Figure 6:
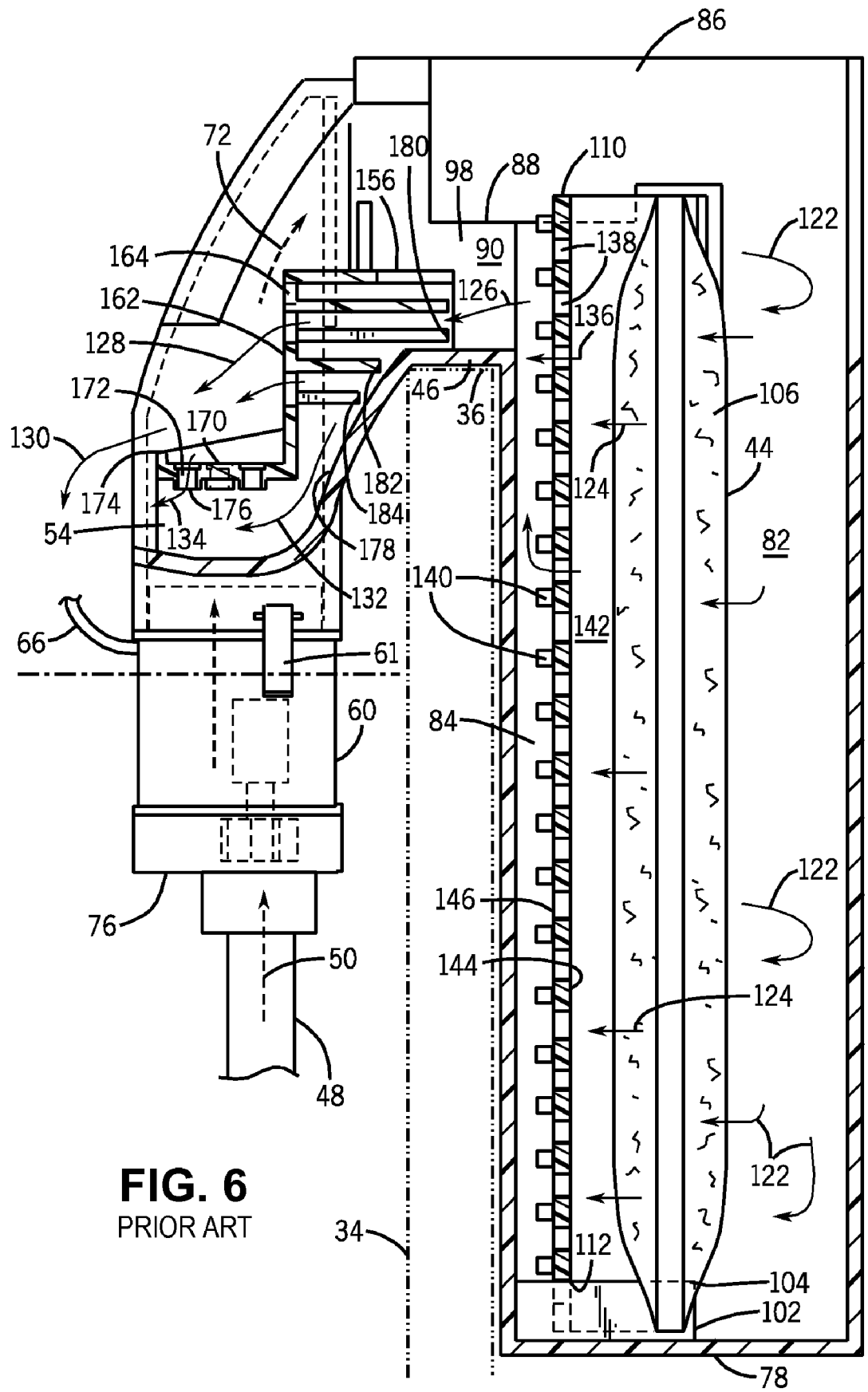
FIG. 6 is a sectional view taken along line 6-6 of FIG. 1.

Housing 22 defines a water flow path therethrough from upstream to downstream from inlet 48 to outlet 54 as shown at arrows 50, 72, 122, 124, 126, 128, 130, 132, 134, 58, including a flow path portion 136, FIGS. 4, 6, through the filter cartridge. Holster 110 has a plurality of water flow openings 138 therethrough, FIG. 5, providing water flow along flow path portion 136. The holster has a plurality of biological reactant surface area protrusions 140 extending therefrom along flow path portion 136 adjacent water flow openings 138. It is known in the prior art to provide biological filtration in aquariums by means of surfaces collecting beneficial bacteria to eliminate toxic ammonia and nitrites, in addition to the mechanical filtration provided by filter element 106, and in addition to chemical filtration which may be provided by filter element 106 additionally containing activated carbon to remove toxic impurities, odors, and discoloration. Filter element 106 and holster 110 have an intermediate plenum 142 therebetween, FIGS. 2, 4, 6. Intermediate plenum 142 is downstream of filter inlet plenum 82, and is upstream of filter outlet plenum 84. Holster 110 has a first face 144 facing intermediate plenum 142, and has a second face 146 facing oppositely from first face 144. Biological reactant surface area protrusions 140 extend from one of such faces, preferably face 146. Holster 110 is preferably downstream of filter element 106, and face 146 of the holster faces filter outlet plenum 84, and biological reactant surface area protrusions 140 extend from face 146 into filter outlet plenum 84.

Optionally, the filter assembly housing outlet 54 has a removable insert 150, FIG. 3 having a plurality of biological reactant surface area protrusions 152 along flow path portion 126, 128 through outlet 54. The insert 150 has a vertical wall 162 having a plurality of transfer openings 164 therethrough, including a first row 166 of transfer openings 167 from which first row 154 of canopies 156 extend horizontally as cantilevers, FIG. 9, and a second row 168 of transfer openings 169 from which the second row 158 of canopies 160 extend horizontally as cantilevers, and so on. Insert 150 includes a horizontal wall 170 on the opposite side of vertical wall 162 from canopies 153 and below transfer openings 164 such that water flow along the noted outlet flow path portion through outlet 54 cascades along the canopies, and then some of the water flows through transfer openings 164 as shown at arrow 128 in FIG. 9 and then flows along horizontal wall 170. The water flow thus steps down in staircase manner from canopies 153 to transfer openings 164 to horizontal wall 170. Horizontal wall 170 has a plurality of discharge openings 172 therein discharging water therethrough back to tank 26. Water which does not flow through discharge openings 172 will spill over the overflow edge lip 174 of wall 170. A plurality of short tubular extensions 176 extend downwardly from horizontal wall 170 from respective discharge openings 172 and provide additional biological reactant surface area protrusions along the inner walls thereof. The water flow cascading at 161 along canopies 153 which does not flow through transfer openings 164 flows downwardly as shown at 132 in FIG. 9 along sloped housing surface 178, and is discharged at outlet 54 beneath horizontal wall 170 of insert 150. In normal operation, the primary flow path is along sloped housing surface 178 as shown at arrow 132, and the water flow path at 128, 130, 134 through the water polisher 150 is an auxiliary flow path. Removable insert 150 has the noted canopies 153, vertical wall 162, and horizontal wall 170. Insert 150 provides a water polisher grid further filtering and charging and aerating the water with extra oxygen creating additional biological filtration, and also providing a quiet water return. The lower rows of canopies are of differing horizontal cantilever length, for example as shown at 180, 182, 184, FIG. 9, to accommodate sloped housing surface 178.

Figure 7:
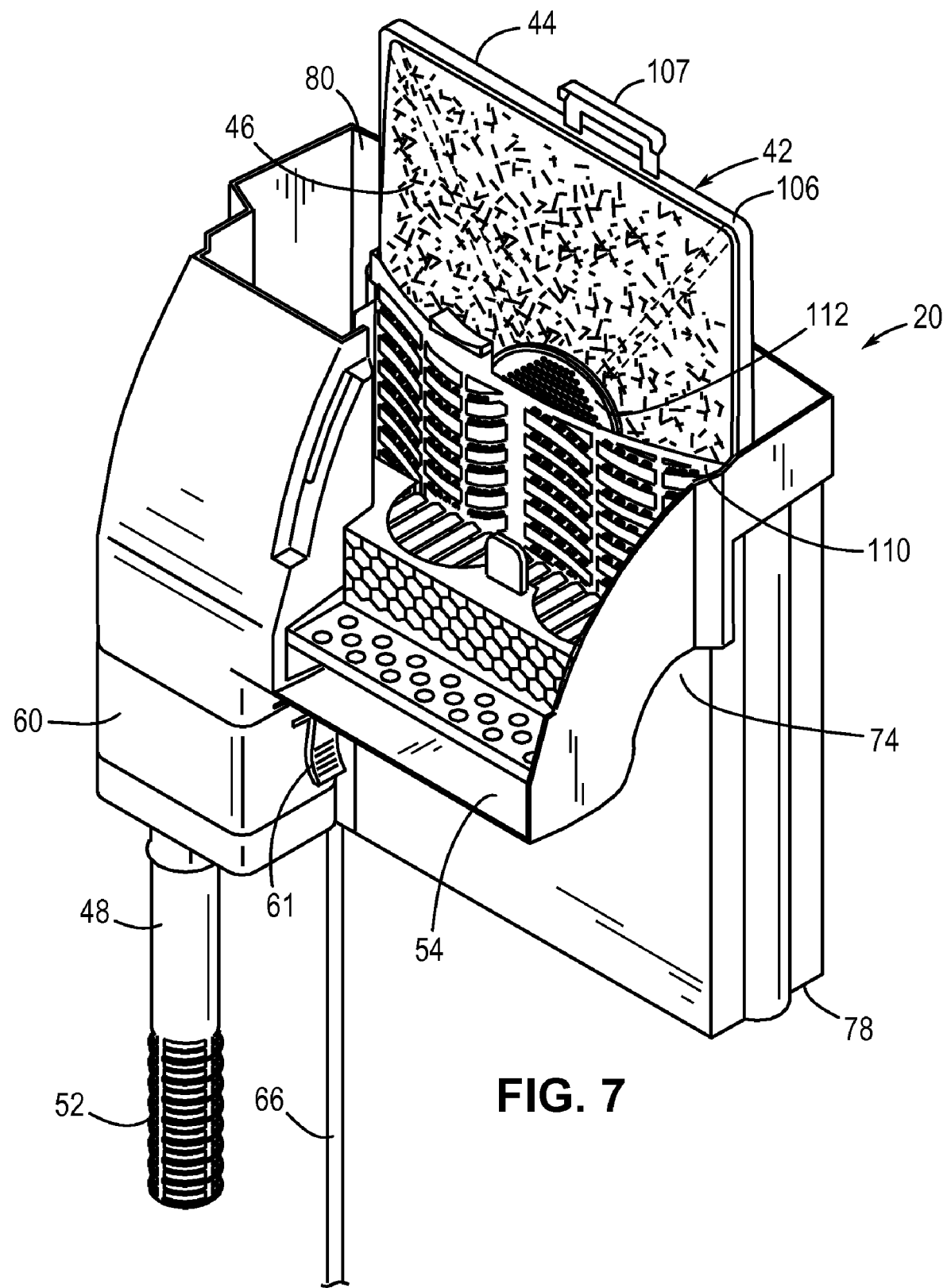
FIG. 7 is a perspective view of one embodiment of an aquarium filter assembly mounted to an aquarium tank and including one embodiment of a filter element as contemplated herein.

As noted above, the aquarium filter assemblies and filter cartridges contemplated herein are not limited to those configurations for aquarium filter assemblies and filter cartridges disclosed in the '534 patent. Other configurations for aquarium filter assemblies and filter cartridges are contemplated, including those disclosed in U.S. Pat. No. 7,569,139 ("the '139 patent") the content of which is incorporated herein by reference in its entirety. The '139 patent discloses an in-tank aquarium filter assembly having a horizontally oriented filter cartridge comprising a horizontally oriented filter element, which also is contemplated herein Present Application Referring now to FIG. 7, shown is a perspective view of one embodiment of an aquarium filter assembly 20 including a filter cartridge 42 comprising a filter element 106 as contemplated herein. In this embodiment, the filter cartridge 42 includes a holster 110 and the filter element 106 is mounted in the holster 110. The filter element 106 includes a downstream face 46 and an upstream face 44. A permeab insert 112 is mounted in the downstream face 46 of the filter element 106 and includes an agent for treating aquarium water (e.g., a chemical agent or a biological agent).

Figure 8:
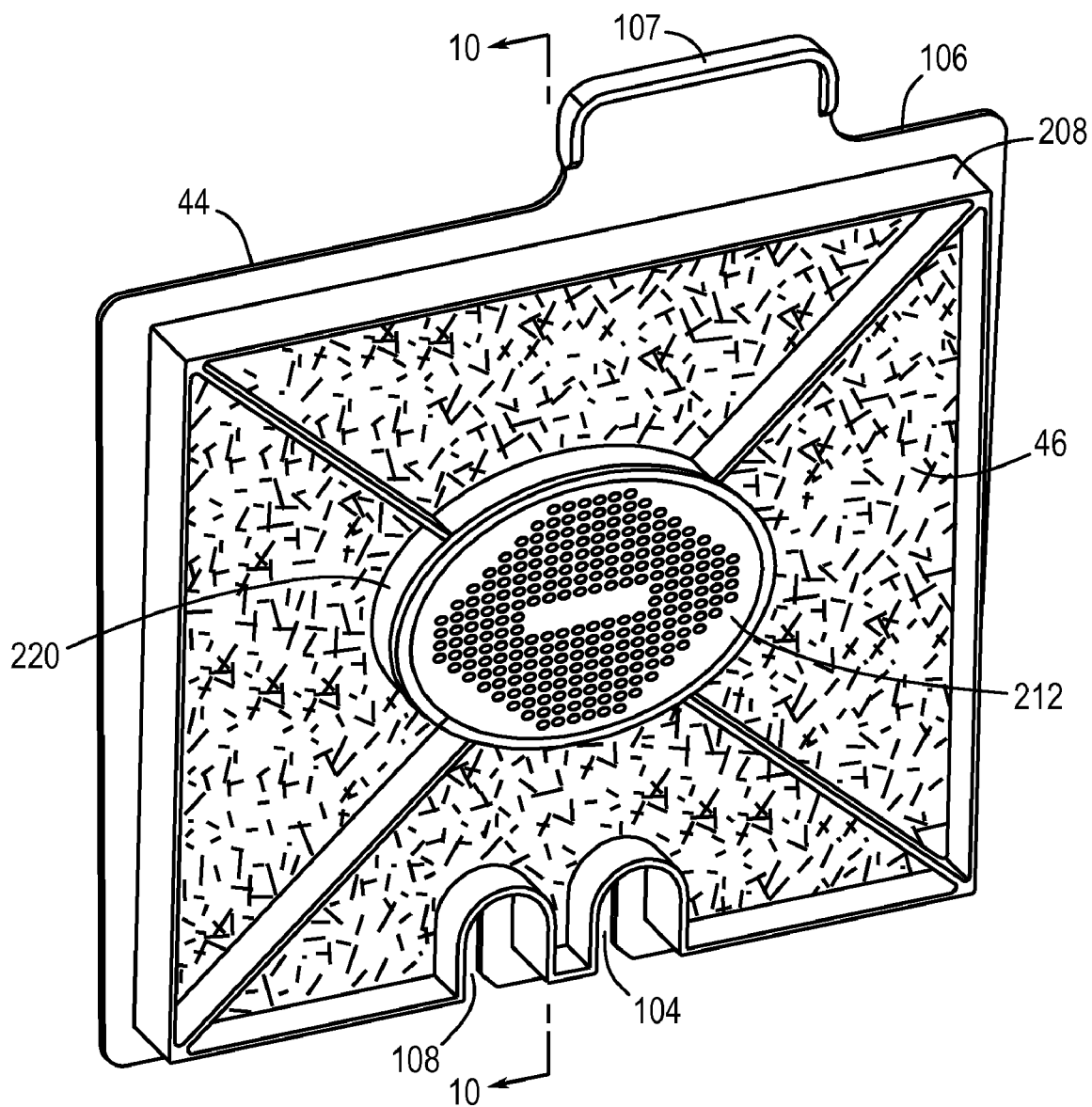
FIG. 8 is a downstream perspective view of one embodiment of a filter element as contemplated herein.
Figure 9:
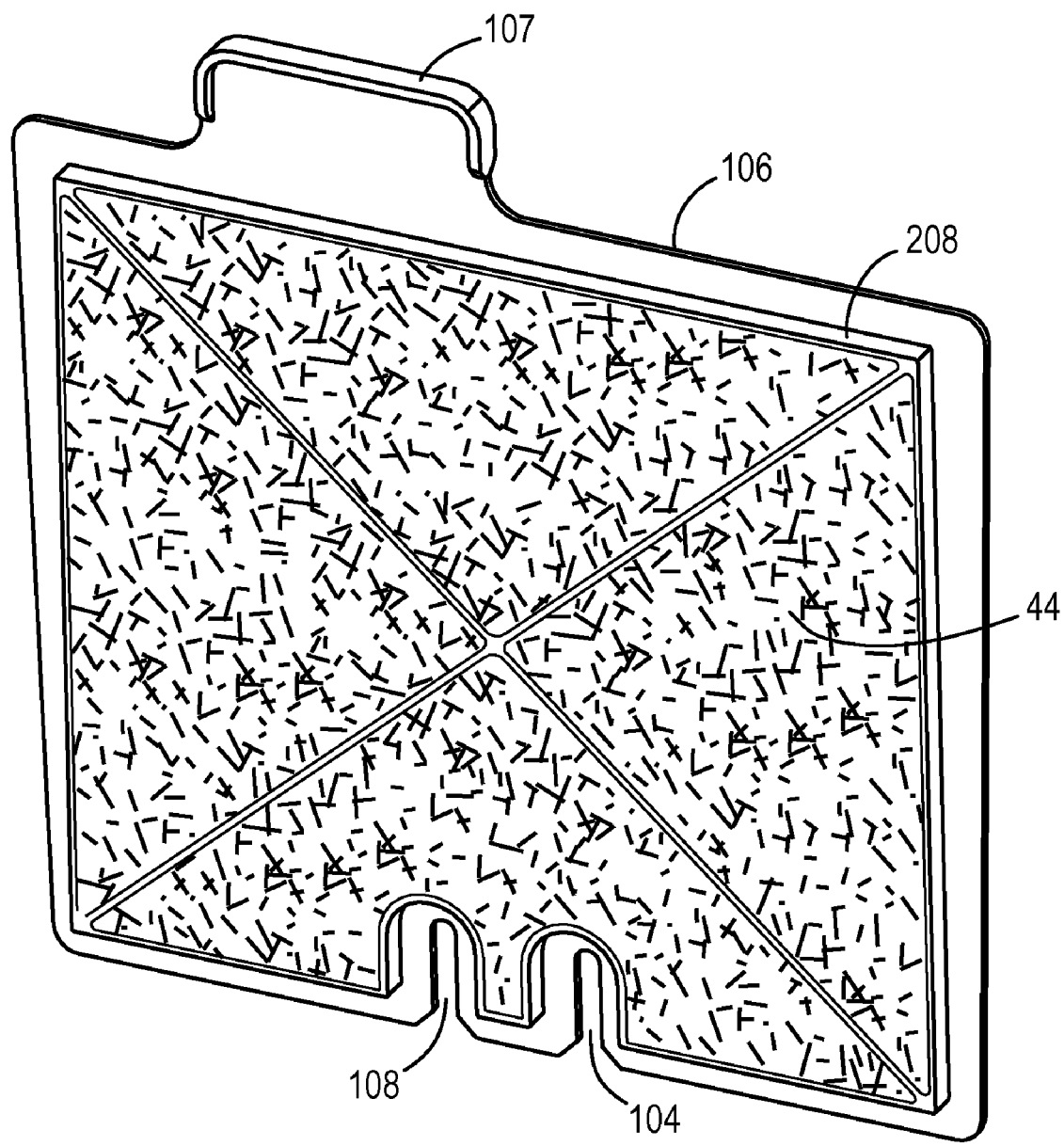
FIG. 9 is an upstream perspective view of the filter element of FIG. 8.
Figure 10:
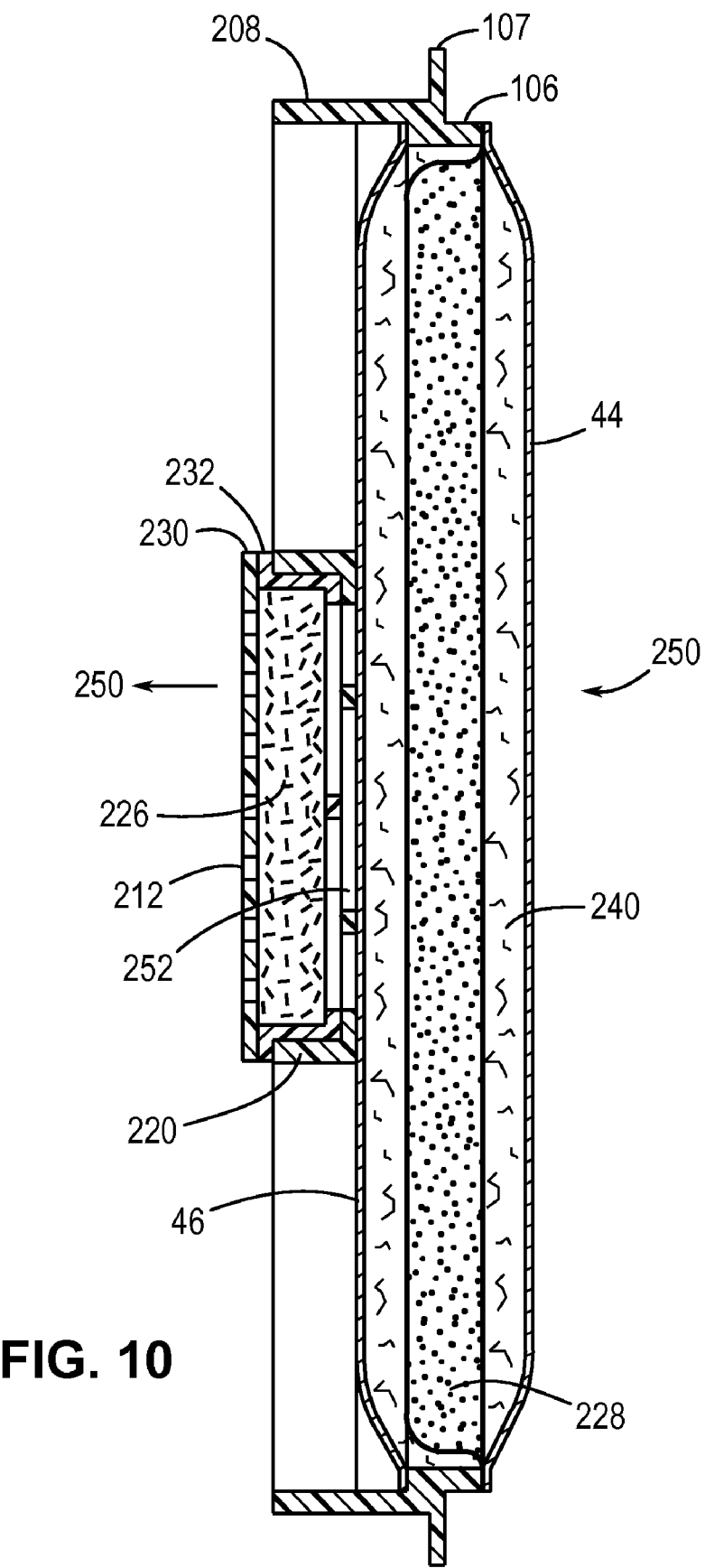
FIG. 10 is a sectional view taken along line 10-10 of FIG. 8.

FIG. 8 is a downstream perspective view of one embodiment of a filter element 106 as contemplated herein. The filter element 106 includes porous filter media material (240, FIG. 10) providing the downstream face 46 and the upstream face 44 for the filter element. Suitable filter media material includes woven or non-woven filter media material as contemplated herein. The filter element optionally includes two walls of filter media material providing the downstream face 46 and the upstream face 44 for the filter element (FIG. 10). The media material optionally contains an agent for treating aquarium water (e.g., carbon material 228 (FIG. 10) as contained between the two walls of the filter media material). The filter element 106 further includes a frame 208 that supports the filter media material. Mounted in the frame at 220 is a porous removable insert 212 that includes an agent for treating aquarium water (e.g., a chemical agent or a biological agent). The filter element 106 further includes at least one keyed detent 104 that mates with keyed detent 102 (FIGS. 2, 4, 5) to at least one of: a) orient and permit mounting of filter element 106 in filter chamber 80 only with upstream face 44 facing filter inlet plenum 82, and downstream face 46 facing filter outlet plenum 84; and b) permit mounting of only an authorized filter element in filter chamber 80, namely a filter element having a coacting keyed detent to mate with coacting keyed detent 102 of filter chamber 80. Optionally, the filter element includes an auxiliary keyed detent 108 spaced from detent 104 and, upon 180° reversal of orientation of filter element 106, coacting and mating with detent 102 to permit orientation and mounting of filter element 106 in filter chamber 80 in an alternate reversed orientation position with upstream face 44 facing filter outlet plenum 84 rather than filter inlet plenum 82, to permit reversal of orientation of filter element 106 as desired. The filter element 106 further includes an optional grip tab 107. FIG. 9 is an upstream perspective view of the filter cartridge of FIG. 8 illustrating the upstream face 44 of the filter element 106 provided by the filter media material (240, FIG. 10).

FIG. 10 is a sectional view of the filter element 106 of FIG. 8 taken along line 10-10. Shown is the frame 208 which supports the porous filter media material 240. The filter media material 240 has two walls which provide the upstream face 44 and the downstream face 46 and which contain a first agent for treating aquarium water 228. A porous removable insert 212 is mounted within the frame at 220 (i.e. the insert mounting portion of the frame). The removable insert 212 includes a housing 232 and a lid 230, which may be removable or non-removable. A second agent for treating aquarium water 226 is contained within the permeable insert 212. Arrows 250 illustrate direction of water flow through the element 106. Water flows through the upstream face 44 (or wall) of the filter media material, through the first agent for treating aquarium water 228, through the downstream face 46 (or wall), into the insert mounting portion of the frame which includes a permeable face 252, into the housing of the permeable removable insert 232, through the second agent for treating aquarium water 226, and out of the removable insert at the permeable lid 230. Alternatively, water flows through the upstream face 44 (or wall) of the filter media material, through the first agent for treating aquarium water 228, and through the downstream face 46 (or wall) of the filter media material without passing through the permeable removable insert 212.

Figure 11:
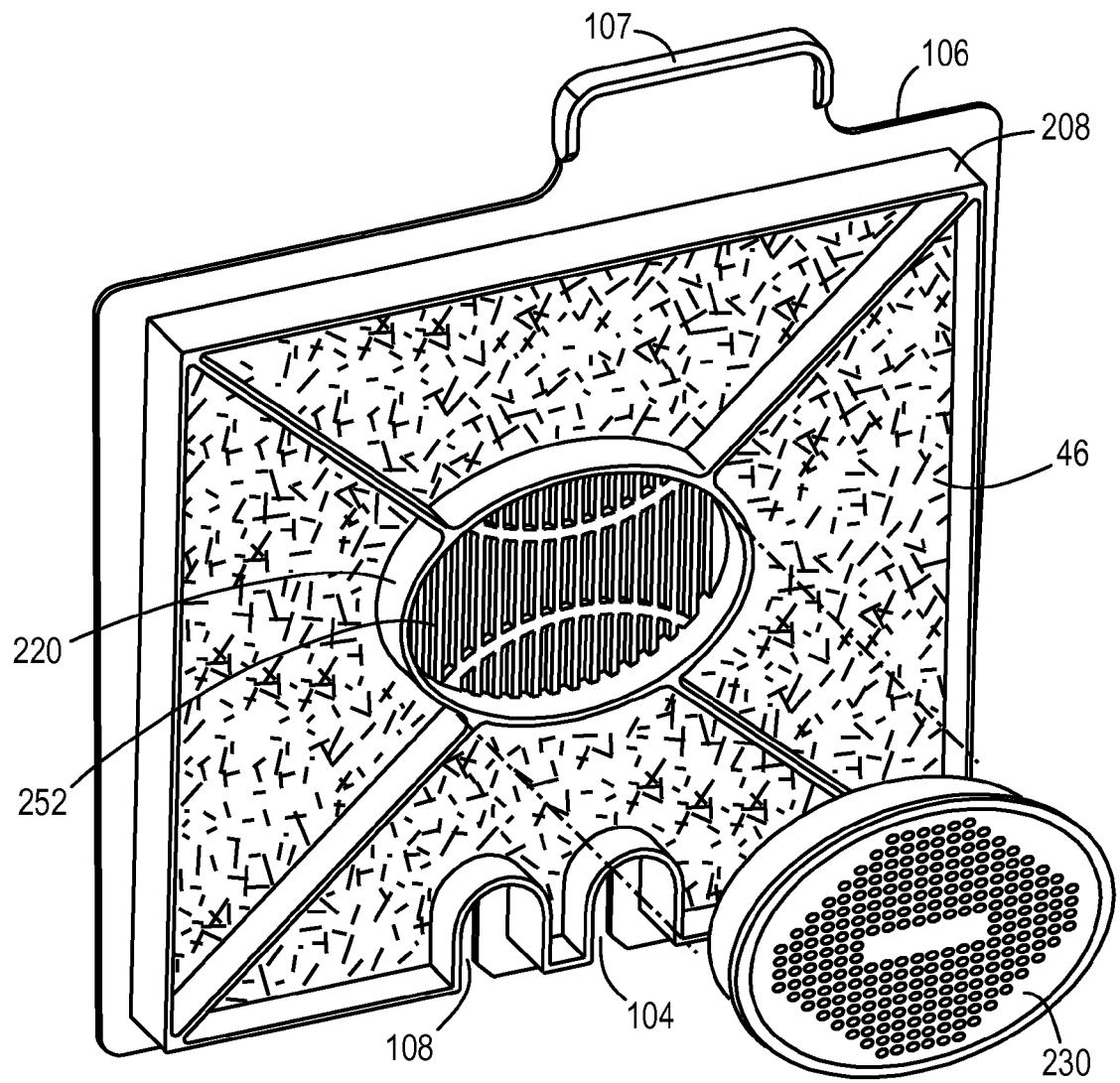
FIG. 11 is a downstream perspective view of another embodiment of a filter element having a removable insert as contemplated herein.

FIG. 11 is a downstream perspective view of another embodiment of a filter element having a removable insert as contemplated herein. In FIG. 11, the housing for the removable insert is provided by the frame at 220 and includes a permeable face 252. The permeable lid of the removable insert 230 has been removed from the housing 220 to permit insertion of a agent for treating aquarium in the housing 220.

Figure 12:
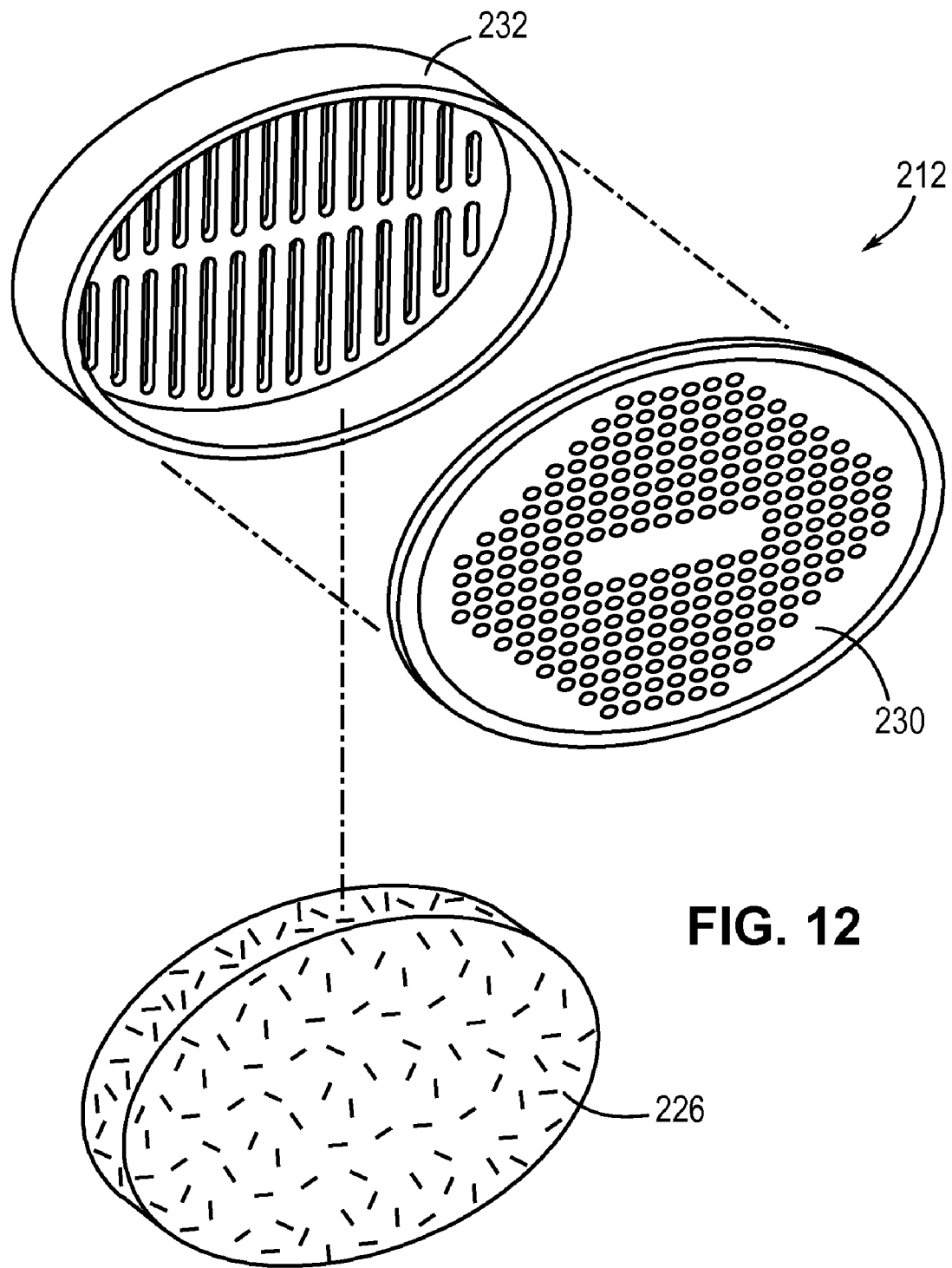
FIG. 12 is an enlarged perspective view of one embodiment of an insert as contemplated herein.

FIG. 12 is an enlarged perspective view of one embodiment of a removable insert 212. In FIG. 12, the removable insert 212 has a porous housing 232 (e.g., where the housing is grated thermoplastic material), and a removable porous lid 230 (e.g., where the lid is thermoplastic material having perforations). Contained within the removable insert is an agent for treating aquarium water 226. The agent 226 is represented as a solid disc in FIG. 12 (which optionally may be a solid, water-soluble material). However, the agent may be present in other forms (e.g., granular forms, fibrous forms, and resin forms, which may be water-soluble or water-insoluble). The removable lid of the insert 230, permits refilling, replacing, or recharging of the agent 226 within the insert. Although FIG. 12 illustrates an insert having a removable lid that permits refilling, replacing, or recharging of the agent 226 within the insert, inserts having non-removable lids also are contemplated, for example, where the insert is placed in the element, utilized, and disposed of after the agent contained within the insert is depleted. A new, fresh insert, then may be replaced in the element.

Figure 13:
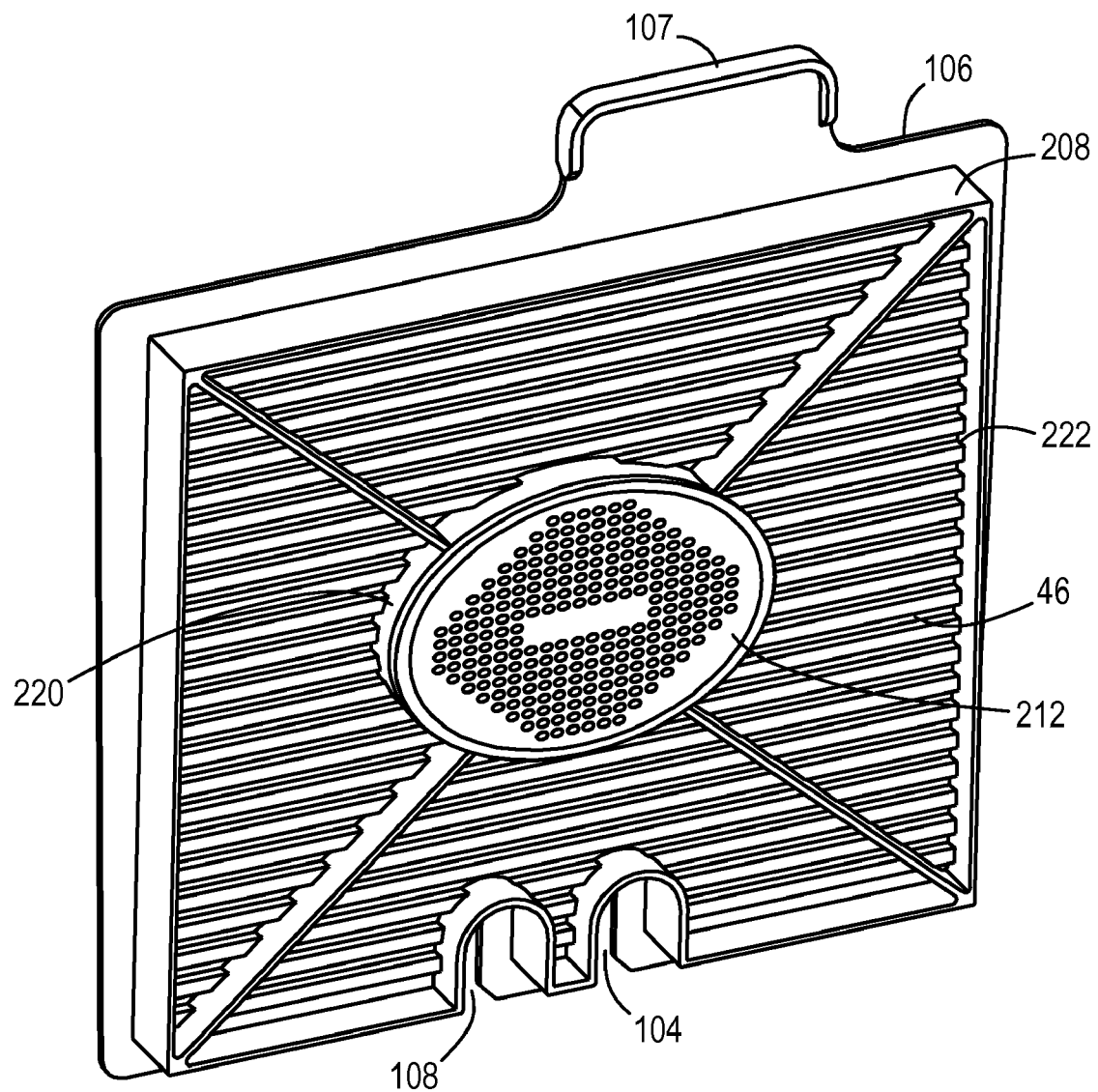
FIG. 13 is a perspective view of one embodiment of a filter element as contemplated herein.

FIG. 13 is a perspective view of one embodiment of a filter cartridge as contemplated herein. In FIG. 13, the filter element 106 includes a downstream face 46 provided by a grated wall 222 (e.g., provided by a grated thermoplastic material). The removable insert 212 is mounted in the grated wall 222.

The filter elements of the present invention have an upstream face and a downstream face provided by filter media material. In some embodiments, the filter elements include a single wall of filter media material having an upstream face and a downstream face. In other embodiments, the filter elements include first and second separate walls of filter media material providing the upstream face and downstream face, respectively. Optionally, the first and second separate walls of the filter elements contemplated herein can be designed to contain an agent for treating aquarium water. Suitable materials include, but are not limited to, particulate filter materials such as carbon material (e.g., activated or high grade carbon, or charcoal).

The filter walls of the contemplated filter elements may comprise a porous filter media material which may include woven or non-woven filter media material. The filter media material can be formed from an open web of closely spaced and randomly disposed fibrous or filamentary substances or a polymeric material which forms a 3-dimensional matrix and provides for numerous interstices or pores defining water passages. Any filter media material or substance suitable for forming such matrices, interstices or pores can be used to form the filter walls of the presently disclosed filter element. Flow of water through the interstices in the membrane material typically provides mechanical filtration of the water by the filter walls retaining solid waste and other contaminants. Increasing the density or surface area of the porous material increases the mechanical filtration capability of the filter wall for finer particulate contaminants. Suitable porous membrane materials include a variety of woven or non-woven water insoluble substrate materials. Particularly useful as the porous materials in the present invention are reticulated foams, synthetic resin fibers, nonwoven fibrous materials and mixtures thereof. Non-woven fibrous materials are described in Riedel, "Nonwoven Bonding Methods and Materials," Nonwoven World (1987); The Encyclopedia Americana, vol. 11, pp. 147 153, vol. 21, pp. 376 383, and vol. 26, pp. 566 581 (1984). Suitable polymeric foams materials include polyurethanes, including a polyether-polyurethane foam or a polyester polyurethane foam; polyesters; olefin polymers, such as a polypropylene or polyethylene; vinyl and styrene polymers such as polyvinylchloride, and polyamides.

In other embodiments, at least one of the filter walls of the contemplated filter elements comprises a permeable or porous wall of solid material such as grated, perforated, or otherwise porous thermoplastic material. Suitable thermoplastic material includes, but is not limited to polyethylene, polystyrene, polyvinyl chloride, and polytetrafluoroethylene.

The removable inserts contemplated herein typically are permeable or porous. For example, the removable inserts may comprise a permeable housing having a permeable lid. Suitable material for the removable inserts includes, but is not limited to, grated, perforated, or otherwise porous thermoplastic material. Suitable thermoplastic material includes, but is not limited to polyethylene, polystyrene, polyvinyl chloride, and polytetrafluoroethylene.

The removable inserts typically include an agent for treating aquarium water (e.g., chemical agents or biological agents that treat water as water passes through the insert). Suitable agents may include, but are not limited to, an ammonia remover (e.g., zeolite), a phosphate remover (e.g., ferric oxide or lanthanum chloride), a nitrate remover (e.g., dolomite), a chlorine remover, a metal remover, a water softener (e.g., peat), and an algaecide. Specific suitable agents include, but are not limited to, standard carbon, activated or high grade carbon, zeolite, granular ferric oxide, lanthanum chloride, ion exchange resin, dolomite, and peat which may be granular or fibrous. The agent may be any suitable shape or form including granular, fibrous, or solid (e.g., as a wafer or disc). The agent may be water-soluble or water-insoluble.

In some embodiments of the filter elements encompassed herein, the filter element includes filter walls of filter media material that contain a first agent for treating aquarium water, and the filter element includes a removable insert that includes a second agent for treating aquarium water that is different than the first agent. For example, the filter walls may contain carbon material, and the filter element may include a different chemical agent or biological agent.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An aquarium filter element for an aquarium filter assembly, the element comprising:
   (a) filter media material;
   (b) a frame supporting the filter media material, wherein the frame surrounds the periphery of the filter media material and the frame comprises a downstream bracket that supports the filter media material; and
   (c) a porous removable insert mounted in an opening provided in the downstream bracket of the frame, wherein the removable insert comprises an agent for treating aquarium water.

2. The element of claim 1, wherein the agent is selected from a group consisting of an ammonia remover, a phosphate remover, a nitrate remover, a chlorine remover, a metal remover, a water softener, and an algaecide.

3. The element of claim 1, wherein the agent is selected from a group consisting of activated carbon, zeolite, granular ferric oxide, lanthanum chloride, ion exchange resin, dolomite, and peat.

4. The element of claim 1, wherein the insert comprises a housing for the agent and a removable lid.

5. The element of claim 1, wherein the filter media material comprises first and second porous walls.

6. The element of claim 5, wherein the porous walls contain carbon material.

7. The element of claim 6, wherein the carbon material is activated carbon.

8. The element of claim 5, wherein the first and second porous walls are non-woven filter media material.

9. The element according to claim 1 wherein the removable insert comprises a housing that contains an agent for treating aquarium water, and the housing comprises a non-removable lid.

10. An aquarium filter element for an aquarium filter assembly, the element comprising:
   (a) non-woven filter media material;
   (b) a thermoplastic frame supporting the non-woven filter media material, wherein the frame surrounds the periphery of the non-woven filter media material, the non-woven filter media material providing an upstream porous wall of the element and the frame providing a downstream porous wall of the element that supports the non-woven filter media material; and
   (c) a porous removable insert mounted in the downstream porous wall, wherein the removable insert comprises an agent for treating aquarium water.

11. The element of claim 10, wherein the agent is selected from a group consisting of an ammonia remover, a phosphate remover, a nitrate remover, a chlorine remover, a metal remover, a water softener, and an algaecide.

12. The element of claim 10, wherein the agent is selected from a group consisting of activated carbon, zeolite, granular ferric oxide, lanthanum chloride, ion exchange resin, dolomite, and peat.

13. The element of claim 10, wherein the insert comprises a housing for the agent and a removable lid.

14. The element of claim 10, wherein the insert comprises a housing for the agent and a non-removable lid.

15. The element of claim 10, wherein the assembly has a housing having mounting structure for mounting to an aquarium tank, the element having a first face and an opposite second face, the housing having a filter chamber receiving the element therein, the element dividing the filter chamber into a filter inlet plenum and a filter outlet plenum, the filter chamber and the element respectively having first and second coacting keyed detents mating with each other to at least one of: a) orient and permit mounting of the element in the filter chamber only with the first face facing the filter inlet plenum, and the second face facing the filter outlet plenum; and b) permit mounting of only an authorized element in the filter chamber, namely a element having the second coacting keyed detent to mate with the first coacting keyed detent of the filter chamber.

16. The element according to claim 15, wherein the first and second detents are aligned with each other and non-symmetrically disposed in offset relation in the filter chamber.

17. The element according to claim 16, wherein the first detent comprises a standing rib extending from the housing into the filter chamber, and the second detent comprises an aligned slot in the element receiving the standing rib in inserted relation.

18. The element according to claim 15, wherein the element has an auxiliary detent spaced from the second detent and coacting and mating with the first detent to permit orientation and mounting of the element in the filter chamber in an alternate reversed orientation position with the first face facing the filter outlet plenum, to permit reversal of orientation of the filter element if desired.

19. The element according to claim 18, wherein the first and second detents are aligned with each other and non-symmetrically disposed in offset relation in the filter chamber when the first face faces the filter inlet plenum; the first detent and the auxiliary detent are aligned with each other and non-symmetrically disposed in offset relation in the filter chamber when the first face faces the filter outlet plenum.

20. The element according to claim 19, wherein the first detent comprises a standing rib extending from the housing into the filter chamber, the second detent comprises a first slot in the element aligned with and receiving the standing rib in inserted relation when the first face faces the filter inlet plenum, and the auxiliary detent comprises a second slot in the element aligned with and receiving the standing rib in inserted relation when the first face faces the filter outlet plenum.

* * * * *